United States Patent [19]

Johri

[11] Patent Number: 5,420,968
[45] Date of Patent: May 30, 1995

[54] DATA PROCESSING SYSTEM AND METHOD FOR DISPLAYING DYNAMIC IMAGES HAVING VISUAL APPEARANCES INDICATIVE OF REAL WORLD STATUS

[75] Inventor: Abhai Johri, Bangalore, India

[73] Assignee: International Business Machines Corporation, Armonk, N.Y.

[21] Appl. No.: 129,907

[22] Filed: Sep. 30, 1993

[51] Int. Cl.⁶ .............................................. G06F 15/62
[52] U.S. Cl. ................................... 395/133; 395/141; 395/155; 395/159; 364/461; 364/424.01
[58] Field of Search ................................ 395/133–139, 395/140, 141, 152, 153, 154, 155–161; 364/461, 424.01; 343/6.5; 340/961

[56] References Cited

U.S. PATENT DOCUMENTS

| | | | |
|---|---|---|---|
| 4,359,733 | 11/1982 | O'Neill | 343/6.5 LC |
| 4,823,272 | 4/1989 | Inselberg | 364/461 |
| 4,845,645 | 7/1989 | Matin et al. | 395/157 |
| 5,111,400 | 5/1992 | Yoder | 364/424.01 |
| 5,157,615 | 10/1992 | Brodegard et al. | 364/461 |
| 5,179,377 | 1/1993 | Hancock | 340/961 |
| 5,261,030 | 11/1993 | Brooke | 395/133 |

OTHER PUBLICATIONS

IBM Technical Disclosure Bulletin, vol. 35, No. 1A, Jun. 1992, "Multi–State ICON," S. E. Smith, pp. 338–339.

Primary Examiner—Almis Jankus
Attorney, Agent, or Firm—Joseph C. Redmond, Jr.; David A. Mims; John D. Flynn

[57] ABSTRACT

A system and method for conveying information to a user on the behavior of a dynamic display image or object which uses a display attribute table that maps an object type's attribute values to the object type's display attributes. Each display attribute in the display attribute table consists of an attribute value and an attribute value priority. The display attributes of a particular object are determined by selecting the display attribute values having the highest display attribute value priority given all the particular object's attribute values. As events change a particular object's attribute values the display attributes for the object are changed on the display by a display update means.

9 Claims, 5 Drawing Sheets

| OBJECT ATTRIBUTE VALUES | COLOR | COLOR PRIORITY | SHAPE | SHAPE PRIORITY |
|---|---|---|---|---|
| IN SECTOR | GREEN | 3 | SQUARE | 8 |
| LEVEL FLYING | GREEN | 6 | ROUND | 0 |
| CONFLICT | RED | 10 | ASTERISK | 2 |
| OUT OF SECTOR | YELLOW | 4 | ROUND | 1 |
| CLIMBING | YELLOW | 4 | TRIANGLE | 3 |

FIG. 5

DATA PROCESSING SYSTEM AND METHOD FOR DISPLAYING DYNAMIC IMAGES HAVING VISUAL APPEARANCES INDICATIVE OF REAL WORLD STATUS

FIELD OF THE INVENTION

This invention relates to controlling the appearance of an object on a display. More particularly the invention relates to changing the appearance of an object on a display to symbolically communicate information about the object to a user viewing the object on the display.

BACKGROUND OF THE INVENTION

Many computer systems are developed today to aid an operator or user in performing or directing certain tasks with respect to real world objects. These computer systems provide the user with information concerning the present state of such objects. Information concerning the state of a real world object is provided via text that describes the current state of the object. The real world objects may be aircraft, helicopters, ships, tanks, trucks, trains, buses, cars, machines, processes, etc. Typically, these objects are represented in a computer system and displayed on a computer screen. These objects are typically represented on a computer screen, using some type of symbol. Information concerning these objects is conveyed via the position of the object on the screen and possibly text associated with the symbol. Since all information concerning a particular object cannot be displayed on the screen, most systems typically provide the user with the ability to select a particular object and view more detailed information. Such systems require the user to perform additional acts to obtain additional information. For example, by selecting the object with an input device or moving a cursor on top of the object as displayed and selecting enter. Upon selection of an object additional information is presented about the selected object. This information can be placed in a window or menu box. The user may also be required to make another selection to remove the additional information from the screen.

This method requires the user to take additional actions (i.e. the selection and deselection) to obtain information. These actions can be time consuming especially when a number of objects are presented on the display and the user desires detailed information on all objects. This problem is compounded when the displayed objects represent dynamic real world objects because dynamic real world objects are constantly changing. Furthermore, when the additional information is presented on the display other objects can potentially be obscured from the user's view. This presents significant problems for real time systems with many dynamic objects.

Several attempts have been made at increasing the information conveyed to the user by changing the visual appearance of the object on the display to reflect its real world state. In systems that manage numerous real world objects a variety of applications can effect changes in a particular dynamic object's state. For instance, in an Air Traffic Control System a variety of applications (e.g.. Conflict Detection. Handoff) may affect the state of a particular aircraft. Thus, each application that potentially can affect the state of a dynamic object must have a complete understanding of the states a particular object type can be in as well as events that cause a particular object to transition from state-to-state. Because in most complex systems, such as an air traffic control system, the objects can take on a large number of states, maintenance of the states and state transitions can be difficult. Furthermore, because there are such a large number of states the applications also need to track which object states effect which visible characteristics of the objects when displayed on the display screen. The mapping of visual characteristics to an object's state needs to be statically defined such that each application can determine the appropriate appearance for a given object it is effecting. This ad hoc method is not practical when the number of possible states of an object are numerous as it provides a combinational explosion in the number of states. Such solutions are time-exhaustive and difficult to maintain. Also, the ad hoc method will not guarantee full coverage where all possible states are considered for display representation. Such an ad hoc method may work in simple systems where the dynamic objects take on only a small number of states, but becomes unmanageable when the number of states and the number of applications affecting the states increase. The ad hoc methods suffer from the fact that information on the object's state and visual characteristics must be built into each application program. This makes changing state information and the visual representation of states for a given object type costly and time consuming. In order to change the visual appearance of the state for a given object type all applications that may effect the visual characteristic would need to be changed. These maintenance problems are compounded when the number of states increases for a given object type.

SUMMARY OF THE INVENTION

The present invention is directed to a method and apparatus that satisfies these needs.

It is an object of the present invention to overcome the above drawbacks of the prior art.

It is an further object of the invention to communicate state information for a dynamic real world object via the visual characteristics of a symbol or symbols on a display.

It is an object of the invention to allow for the ease of maintaining a dynamic object's state and corresponding visual characteristic information.

It is an object of the invention to allow for the ease of maintaining a dynamic object's state and corresponding visual characteristic information when the dynamic object can be in one of a large number of states.

It is still a further object of the invention to provide a means for considering all the states of an dynamic object at any given instant in time in assigning display attributes for its visual representation.

It is another object of the invention to provide a simple means for assigning display attributes for all states of a dynamic object type.

It is an object of the invention to provide an improved and adaptable human computer interface.

It is an further object of the invention to consider the state of an object and determine its visual characteristics in a time efficient manner.

Accordingly, the present invention provides a system and method for symbolically conveying information to a user on the behavior of a dynamic object. The invention uses a display attribute table that maps an object type's attribute values to the object type's display attributes. Each display attribute in the display attribute table consists of an display attribute value and an display attribute value priority. The display attributes of a particular object are determined by selecting the display attribute values having the highest display attribute priority given a particular object's attribute values. As events change a particular object's attribute values, the display attributes for the object are changed on the display by a display update means.

In response to a change of the value of one or more of an object attributes of any dynamic object, the display update means reads the display attribute value and the display attribute priority of each display attribute associated with each of the object attribute values of the changed dynamic object from the display attribute table, the display update means selects the display attribute value with the highest display attribute priority for each display attribute, the display update means then updates the visual appearance of the dynamic object on the display means in accordance with the selected display attribute values.

Applications can be given create, read, update and delete access to the dynamic objects stored in the dynamic object store. The applications can be located on other computer systems interconnected by a computer network to the computer systems containing the display access table and the display object store. The display access table and the display object store may also be contained in a database. The database may be placed on a file server. Applications then become clients of the database on the server. Applications or a user may cause object attribute values to change causing the display update means to update the visual characteristics of a dynamic object on the display.

BRIEF DESCRIPTION OF THE DRAWING

These and other objects, features, aspects, and advantages of the present invention will become better understood with regard to the following description, appended claims and accompanying drawings where:

DETAILED DESCRIPTION OF THE INVENTION DEFINITIONS

The foregoing and other objects, features, and advantages of the invention will be apparent from the following more particular description of the preferred embodiment of the invention, as illustrated in the accompanying drawings.

"Object Type" is a class of objects such as airplanes, ships, cars, trains, and computer processes, etc. Each object type has a predefined set of object attributes.

"Object" is a particular instantiation of an object type (e.g., a particular airplane is an object that is a member of the object type airplane).

"Object attributes" refers to a particular feature of a "object" or "object type". For instance, a flight profile could be an object attribute of the object type aircraft. The flight profile attribute could take on one of the following attribute values: level, ascending, descending.

"Display Attributes" define a given visual characteristic of an object on the display. Examples of display attributes include color (foreground, background), font, shape, size, fill, pixmaps, icons. etc. Note that multiple shapes could be provided for such that multiple symbols could be combined. For instance, a red triangle could be placed inside a green square thus there are two shape attributes and two color attributes. The use of more than one symbol to represent an object is useful in distinguishing different object types (i.e., aircraft and helicopters) that might be displayed on the same display.

"State" represents a collection of a particular object's attribute values at a given instant in time. A state thus can represents a situation or location of a object at a given instant in time. For example, for the object type of aircraft having object attributes of latitude, longitude, altitude and flight profile, a state might be 35 degrees North, 115 degrees West, 10,000 feet, and level. The state of a particular object is a collection of the object's attribute values.

"Display State" refers to a collection of an object type's attribute values that are used to determine the display attributes of a particular object. The display state may use a subset of the object type's attribute values.

"Event" represents an input that triggers a state transition by changing the current state of the object to a new state. An event changes one or more of an object's attribute values. An event can be generated manually by the user or may be generated automatically by an application, task or process. Examples of manual events, for an Air Traffic Control system with an aircraft object type, include acknowledgement of handoffs and selection of conflict resolution. Examples of automatic events, for an Air Traffic Control system with an aircraft object type, include periodic update of aircraft location, conflict situation, conformance violation, and automatic initiation of handoff.

"State Transition" occurs when an object changes from one state to another state as a result of an event. "Display state transition" occurs when the event effects an object attribute values used to determine the object's display attributes.

OVERVIEW

Figure 1:
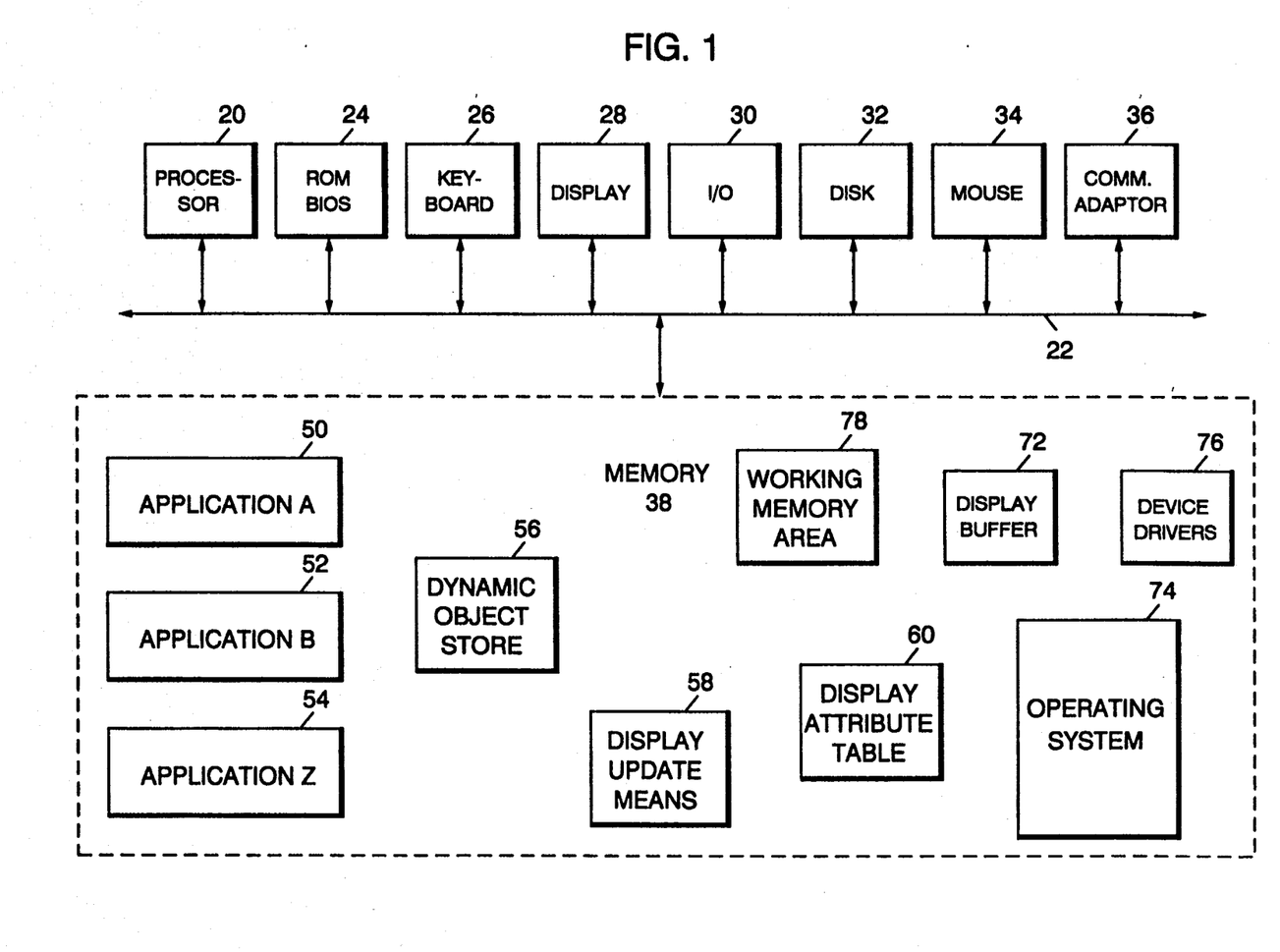
FIG. 1 is an architectural block diagram of a computer system depicting the memory having read therein a series of applications, a display object store, display attribute table, and a display update means.

The preferred embodiment of this invention comprises a set of computer programs for controlling the interaction between a user and a computer system as shown in the architectural block diagram of FIG. 1. FIG. 1 includes a processor 20 connected by means of a system bus 22 to a read only memory (ROM) 24 and a memory 38. The processor 20 may be a microprocessor such as is found in the IBM PS/2 personal computer model 80, as well as several models of IBM RISC System/6000 machines (IBM, PS/2 and RISC System/6000 are trademarks of International Business Machines Corporation). Also included in the computer system in FIG. 1 are a display 28 by which the computer presents information to the user, and a plurality of input devices including a keyboard 26, mouse 34. Other input devices such as other pointing devices or a voice sensors or image sensors may also be attached. Other pointing devices include tablets, numeric keypads, touch screen, touch screen overlays, track balls, joy sticks, light pens, thumb wheels, etc. The I/O 30 can be connected to communications lines, disk storage, input devices, output devices or other I/O equipment.

An operating system 74 is also included in memory 38. Examples of operating systems include AIX and OS/2. Other elements shown in memory 38 include device drivers 76 which interpret the electrical signals generated by devices such as the keyboard and mouse. A working memory area 78 is also shown in memory 38. The working memory area 78 can be utilized by any of the elements shown in memory 38, such as the applications (50, 52, 54), operating system 74 and other functions. The working memory area 78 may be partitioned amongst the elements and within an element. The working memory area 78 may be utilized for communication, buffering, temporary storage, or storage of data while a program is running. The working memory area 78 may also be utilized by the operating system for multi-tasking purposes. The working memory area 78 can be included as part of the application or it may be located in a common area. In either case, there is no requirement that the working memory be contiguous in memory 38.

The memory 38 includes a dynamic object store (DOS) 56, display attribute table (DAT) 60, and the display update means (DUM) 58. The dynamic object store 56 can contain one or more object types and one or more objects for each object type. Thus, the DOS 56 may contain object types such as helicopter and aircraft; and for each object type may contain a number of such objects (i.e, 4 helicopters and 5 aircraft). For each object in the dynamic object store 56, the dynamic object store contains the current value of that object's attribute values. The DOS 56 may be stored in a database to provide standardized access and ease of maintenance. A relational or object oriented database is suitable for storing information required by the DOS 56.

The DAT 60 maps object attribute values to display attributes for a given object type. Each display attribute in the DAT 60 consist of an attribute value and an attribute priority. The DAT 60 consists of as many rows as the total number of object attribute values and twice as many columns as the types of display attributes. For multiple object types the DAT 60 may consist of multiple tables (i.e., one for each object type) or one big table. Note that as used above table refers to a logical organization and that the physical representation may consist of many tables. This is particularly true if a relational database is used and the tables are normalized. The DAT 60 may be stored in a database to provide standardized access and ease of maintenance. A relational or object oriented database is suitable for storing information required by the DAT 56.

The DUM 58 monitors or is informed of changes to display object attribute values of objects in the display object store 56. The DUM 58 is also informed of object deletions and additions. When an object attribute value is changed or an object is added or deleted, the DUM 58 accesses The DAT 60 and updates the appearance of the changed object on the display. The DUM 58 may consist of a separate application, program, or task; it may also be called by an application or can be incorporated into an application so that when the application changes a object attribute in the DOS 56 it causes the DUM 58 to be invoked as part of the application.

Figure 2:
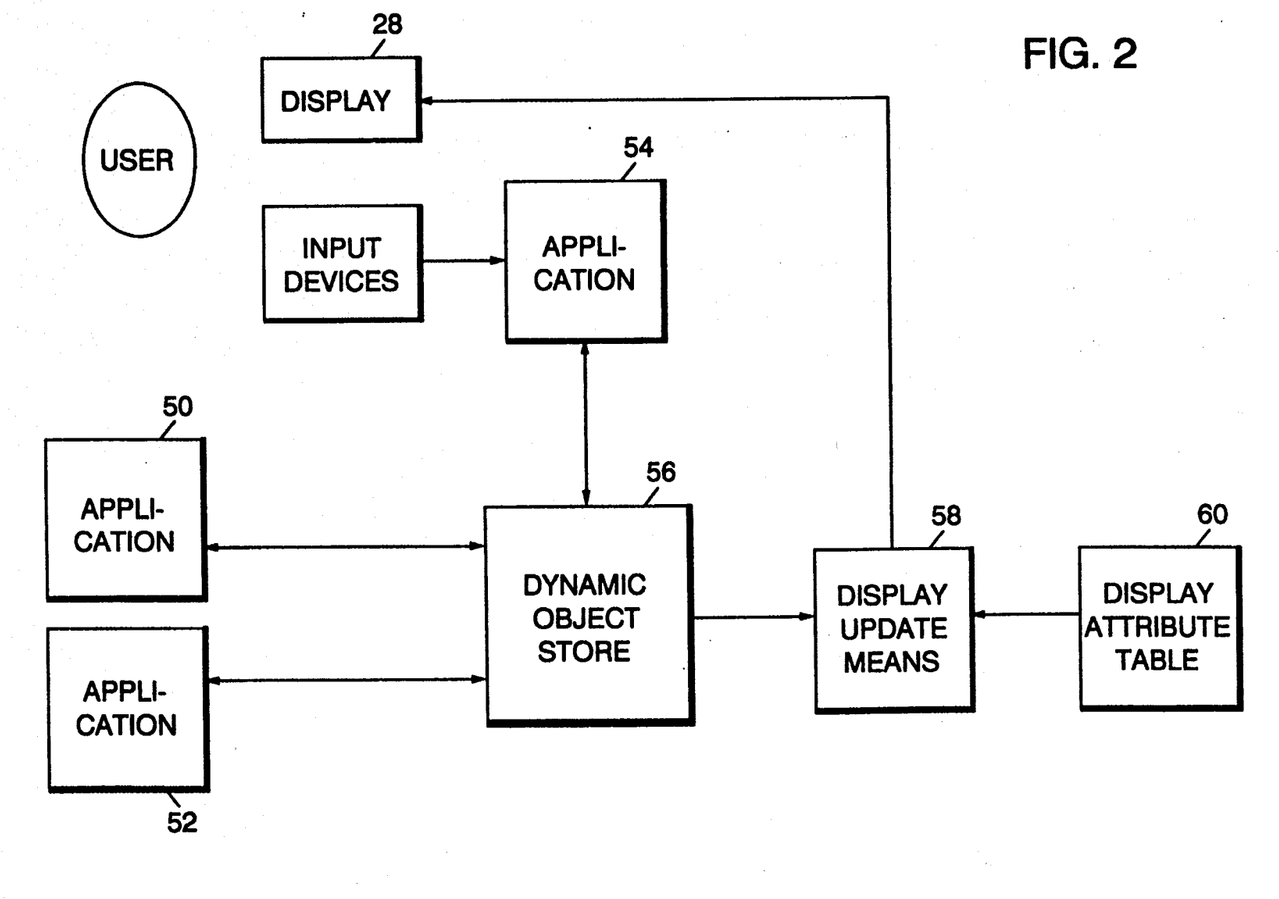
FIG. 2 shows a block diagram depicting the functional relationships of one embodiment of the invention.
Figure 4:
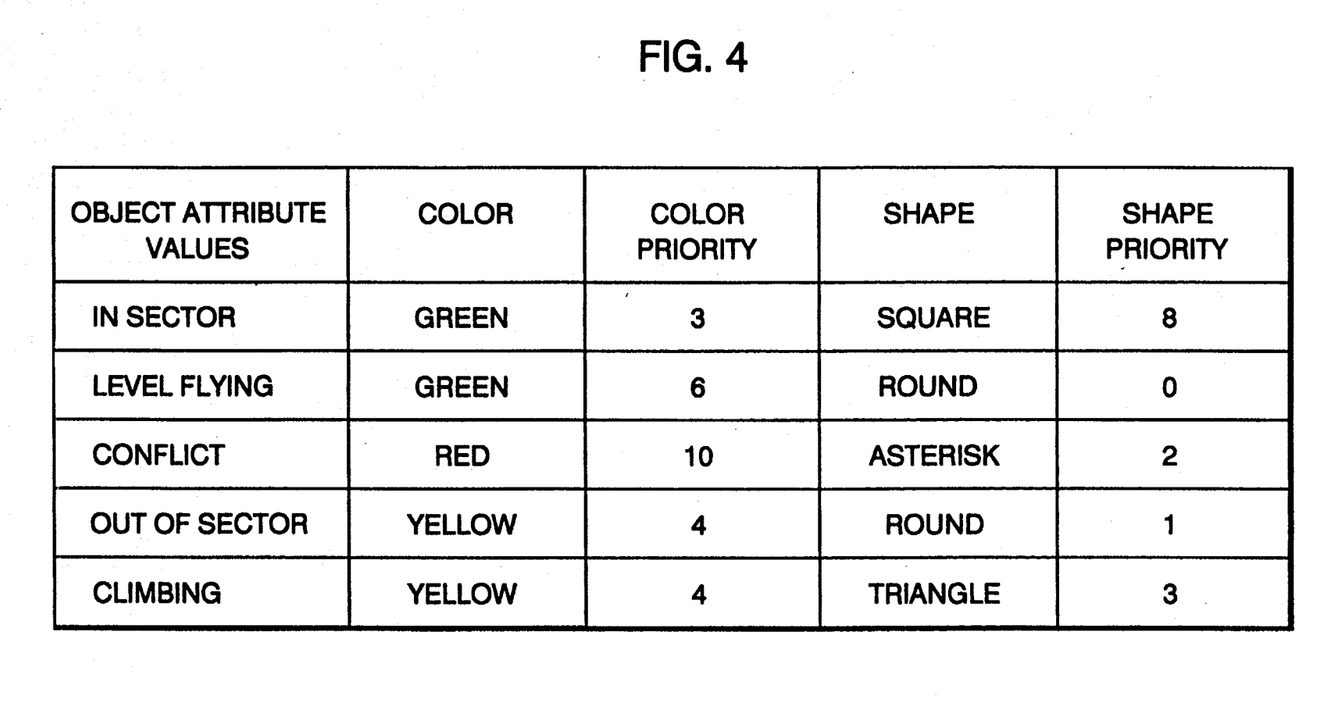
FIG. 4 depicts the contents of a sample display attribute table.

Turning now to FIG. 2 the display update means 58 is notified of changes to attribute values of objects stored in the dynamic object store 56 or it itself determines if any changes have taken place to any object attribute values in the DOS 56. Such changes may be caused by an event or a response to an event such as a user action. When one or more of an object's attribute values change the display update means 58 reads the object's attribute values for the object from the dynamic object store 56. For a given display attribute, the DUM 58 reads the display attribute value and display attribute value priority associated with each of the object's attribute values in the DAT 60. A sample DAT 60 is shown in FIG. 4. This process is repeated for each display attribute so that for each display attribute the DUM 58 selects the display attribute value with the highest display attribute value priority. The DUM 58 then causes the display to reflect the display attribute values selected for the object. This process can be repeated for each object or anytime any object changes. A psuedocode representation for updating a given object is shown in Table I. Note that the psuedocode in Table I represents one embodiment of the invention and other techniques will be apparent to those of ordinary skill in the computer programming field.

TABLE I

| Psuedocode for Display Update Means |
| --- |
| { Given an Object }<br>  For each Display_State_Attribute<br>    Begin {}<br>      For each Object_Attribute_Value<br>        Begin {}<br>          Read the Display_State_Attribute_value and Display_State_Attribute_priority associated with the Object_attribute_value<br>        End {}<br>      Select the Display_State_Attribute_Value with the highest Display_State_Attribute_priority<br>    end {}<br>  Update the Display with the selected attribute_values for Each display_Attribute |

Figure 3:
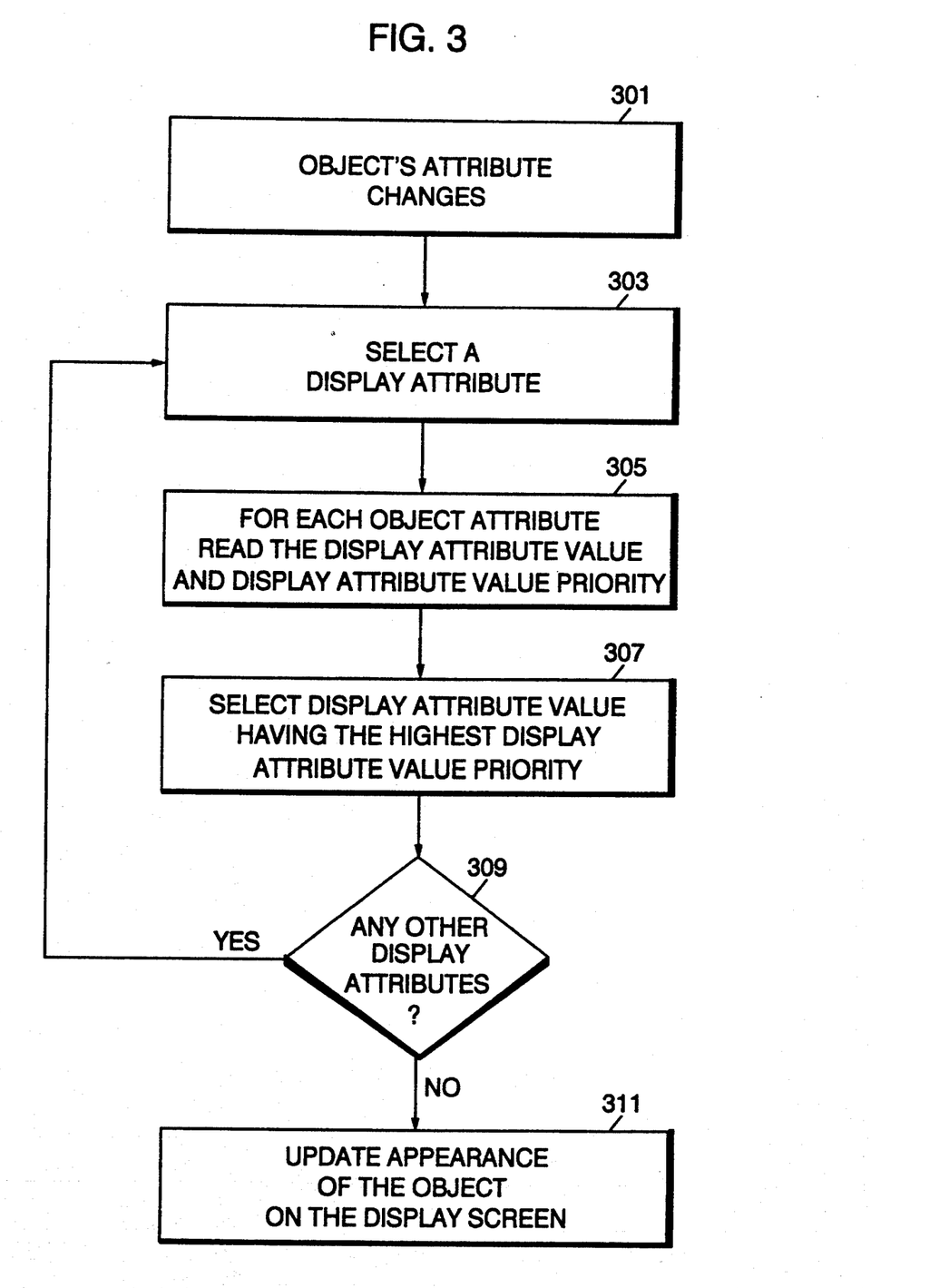
FIG. 3 is a flowchart depicting one embodiment of the invention.

Turning to the flow diagram in FIG. 3. In step 301 the DUM 58 is informed that at least one of the objects has had an object attribute value change. The DOS 56 may contain object attributes for a given object type that if changed will not have any effect on the displayed representation of an object. The dynamic object store 56 may contain more object attribute values than are used in the DAT 60. For instance, the number of passengers on a particular aircraft may be an object attribute of the object type aircraft but, the object attribute is not used to effect the visual characteristics or the display state of the aircraft. It is of course more efficient if the DUM 58 is notified only when an object attribute effecting the display state is modified. The DUM 58 need only be invoked when an event affecting the display state for a given object has occurred. The DUM 58 could also be programmed with this feature. Thus, the DUM 58 could filter out events not affecting the display state (i.e., events having no effect on object attribute values listed in the DAT 60 would be filtered). In step 303 the DUM 58 starts with a display attribute. For instance, shape. In Step 305, the DUM 58 reads the display attribute value (i.e., circle, square, triangle, etc..) and the associated display attribute value priority for all object attribute values in the DAT 60. In step 307 the DUM 58 selects the display attribute value having the highest display attribute value priority. In step 309 a check is made to determine if any other display remain. If all the display attributes have not been selected then steps 303 through 309 are repeated until no display attributes remain. When all display attributes have been selected and assigned values then the display is updated in step 311. Although not shown in FIG. 3, the display attributes could be updated as the display attributes are determined instead of all at once as shown in step 311.

Returning now to FIG. 1 the memory 38 includes application A 50, application B 52, application Z 54. These applications can change the object attribute values for objects in the DOS 56. As shown in FIG. 2 the applications can read and write to the DOS 56. The applications may create, read, update or delete objects from the DOS 56. The applications can change object attribute values based on user input or from the analysis and processing of data collected from sensors such as radar, identification friend or foe (IFF), cameras, acoustics, Infra-red, or other sensing mechanisms. For example object attribute values may change as a result of the aircraft changing position such as when it moves across a sector boundary. Many applications can effect various different objects and object attributes. The applications themselves may simulate or emulate the real world representation of objects.

Although the applications 50. 52, 54 are shown in FIG I in the same memory as the DOS 56. DAT 60, there is no need for these elements to be located on the same computer system. These elements may be located in separate computer systems that are connected by a computer network. The DOS 56 could be located on a fileserver or database server. Applications could utilize the computer network to obtain necessary access to the DOS 56. The DAT 60 could also be placed on the same fileserver as the DOS or a different fileserver. In another embodiment the applications are considered clients of the server containing the DOS 56 and DAT 60 so that a client/server architecture is implemented.

The applications require no specific knowledge of the display state of an object or the current display attributes. In the embodiment shown in FIG. 2 the applications are not provided with access to the DAT 60. All display updating takes place via the DUM 58. This isolates the application's from having to know the details of the display attributes as well as the display state transitions. Note that the applications could contain the functionality provided by the DUM 56 by including the DUM 56 function in each application. Including the DUM function in each application complicates maintenance of the DUM function particular when changes are required. Each application may read from the DOS 56 and modify attribute values based on the data read. For instance, an application that determines if a conflict exists may periodically read the positions of all aircraft in the DOS and determine if any conflict exists between the aircraft. If a conflict exists the application will set the attribute value of all aircraft that are determined to be in conflict to Conflict. The DUM 58 will then change the appearance of these objects accordingly on the screen. Note that the Conflict determining application did not need or require any information on the display attributes of the aircraft when it was determining that a conflict existed. The DAT 60 liberates the applications from having to know the display state and display attributes.

If changes, in what information is conveyed to the user or how such information is communicated or presented to the user, are desired all that needs to be updated is the DAT 60. This greatly simplifies maintenance of the display software. No changes are required to be made to the applications or the display object store 56. All that needs to change is the DAT 60. Great flexibility is provided by the DAT 60 by virtue of the priority value associated with each display attribute. The representation of object's state on a display screen can be effected by changing the priority values for a given display attribute. This permits the system to be modified to perfect an easy to understand model of the real world system and easily tailor that model to suit the user's needs. Such maintenance can easily be provided by a program capable of reading and writing to the DAT 60 and displaying portions of the DAT 60 on a display permitting the user to change various values, add, modify delete display attributes, display attribute values, display attribute value priority and the object attribute values. If the DAT is stored in a database these functions can be provided by the database software. A maintenance application allows a user to modify the DAT as required.

EXAMPLE OF OPERATION

An example for an air traffic control system will demonstrate an embodiment of the invention. An air traffic control display reveals several types of static and dynamic objects. A static object is a representation of air routes, airports, etc. The present invention is illustrated using a aircraft as a dynamic object type. The situation or state of an aircraft may change dynamically due to progressive change in its geographical location, pilot's course of action, its destined route, presence of other aircraft, etc. During the course of its flight, an aircraft may take on several attribute values (e.g.. Aircraft Ascending. Aircraft in Control Sector. Aircraft Outside Control Sector, Aircraft In Conflict with Another Aircraft. etc.). At any given time an aircraft state may consist of more than one attribute value (e.g., an Aircraft In Control Sector. In Conflict with Another Aircraft, and Descending all at the same time). In an air traffic control systems it is desirable to depict an aircraft in different situations with unique visual representations to aid controllers in identifying different situations promptly.

For this example it is assumed that the aircraft can have the following attribute values: In Sector, Level Flying. Conflict. Out of Sector, and Climbing. Also assume that them are two display attributes: color and shape. A display access table is shown in Table II. Notice that for each object attribute there are four entries: color, color priority, shape and shape priority.

TABLE II

| Object Attribute Values | Display Attribute Table | | | |
| --- | --- | --- | --- | --- |
| | Color | Color Priority | Shape | Shape Priority |
| In Sector | Green | 3 | Square | 8 |
| Level Flying | Green | 6 | Round | 0 |
| Conflict | Red | 10 | Asterisk | 2 |
| Out of Sector | Yellow | 4 | Round | 1 |

TABLE II-continued

| | Display Attribute Table | | | |
|---|---|---|---|---|
| Object Attribute Values | Color | Color Priority | Shape | Shape Priority |
| Climbing | Yellow | 4 | Triangle | 3 |

For each object attribute value, there is a color, a color priority, a shape, and a shape priority. The displayable slate will consist of two display attributes: color and shape. The object attribute value with the highest color priority is used to determine the color of the displayable state, and the object attribute value with the highest shape priority is used to determine the shape of the displayable state.

For purpose of this example we assume that a particular aircraft has the following attribute values: In Sector, Level Flying, and Conflict. In this example, among the three required object attribute values, the Conflict value has the highest color priority (10), and the In Sector value the highest shape priority (8). Therefore, the displayable state of the aircraft object would have the following display attribute values: red for the color attribute and a square for the shape attribute. These attribute values of the displayable state are used to display the aircraft on screen at that instant. Any object having only the object attribute values of In Sector, Level Flying and Conflict is displayed on the display screen as a red square.

Now suppose the particular aircraft above has traveled such that it has moved across a sector boundary. An application program could detect this condition or event. The application program responds to this event by changing the attribute value from In Sector to Out of Sector. The DUM 58 is informed of this event. The aircraft's new attribute values are: Out of Sector. Level Flying, and Conflict. Referring to Table II, of the three object attribute values Conflict has the highest color priority (10) and Conflict also has the highest shape priority (2). Therefore, when the particular aircraft left the sector the aircraft would change appearance on the display from a red square to a red asterisk in accordance with the DAT in table II. Note that the each operator could have the same objects displayed on their display screen but, with different visual characteristics. For instance, a particular aircraft that is in sector for one operator may be out of sector for another operator given that the operators are responsible for different sectors.

Figure 5:
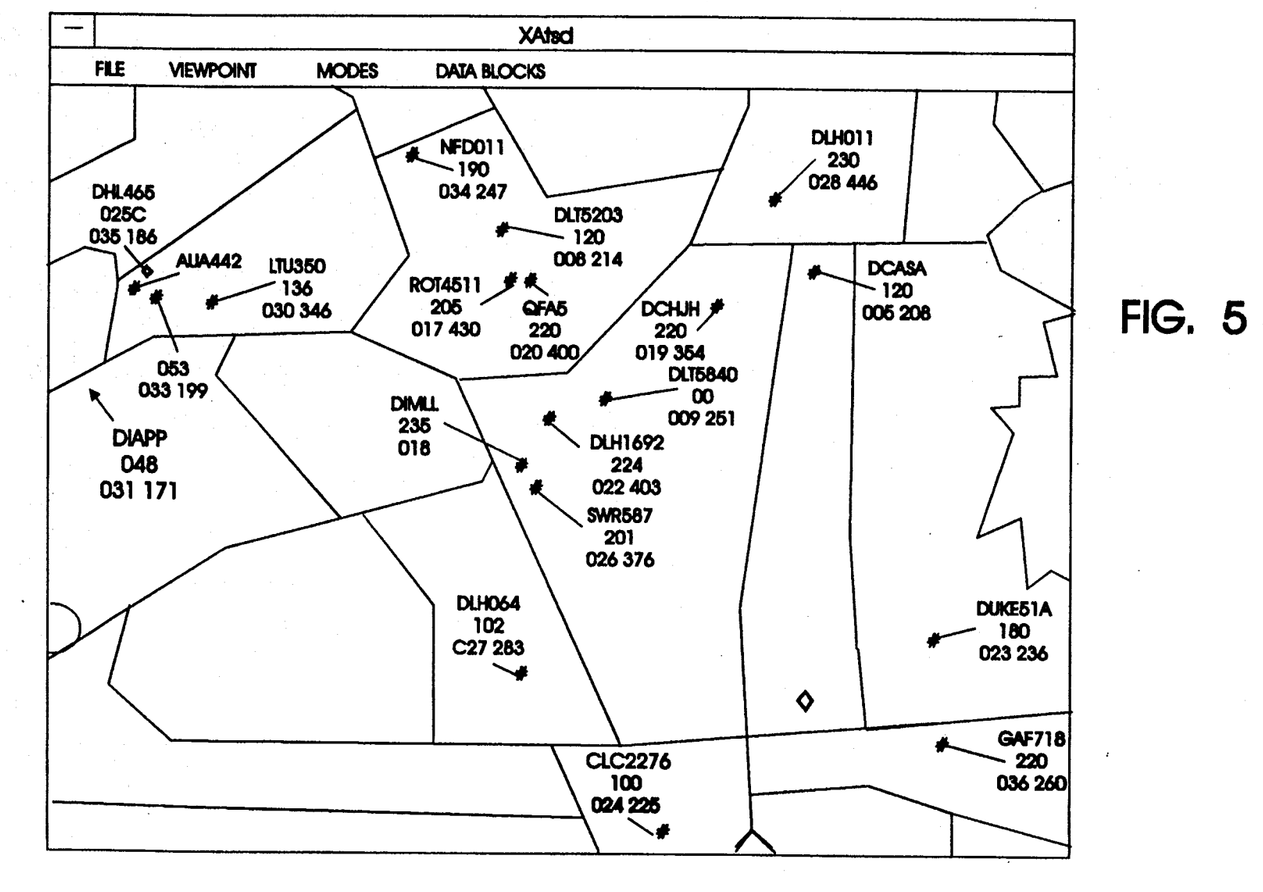
FIG. 5 shows the display with several display objects shown in different states.

In the example above the DAT is used to determine the display attributes of a particular aircraft on the display screen. Note that the position of the aircraft symbol on the screen is determined by the aircraft's position attributes. The DUM or another process or application places the symbol at a location on the display screen according to projection, view, scale, zoom factors selected for a particular display and the position of the particular aircraft. FIG. 5 depicts a display showing several aircraft in various states.

The DAT 60 consists of as many rows as the total number of object attribute values and twice as many columns as the types of display attributes. The total number of object attribute values and types of display attributes is usually small in a given system. Thus, this table provides a simple and tractable means for adaptation of object attribute values and display attributes for any object type. This approach gives flexibility to users to prioritize different attribute types differently for each state based on individual requirements and feasibility study, and thus enables improved and adaptable human computer interface.

While the invention was described with respect to an air traffic control environment it is quite general in nature and can be applied to other such applications, e.g., battle field representation, shipyard traffic control, weather pattern display, etc. While the present invention has been described with reference to structures disclosed herein, it is not confined to the details set forth and this disclosure is intended to cover such modifications or changes as may come within the purposes of the improvements or the scope of the following claims.

What is claimed is:

1. A computer system including a processing means, a memory means, a display means, input means interconnected by a system bus, a subsystem for updating a visual appearance of dynamic display images or objects presented on a display means, comprising:
   a dynamic object store in the memory means, said dynamic object store having at least one dynamic object, said dynamic object having a plurality of object attributes, each object attribute having an associated object attribute value;
   a display attribute table in the memory means, said display attribute table consisting of a plurality of object attribute values and for each object attribute value an associated plurality of display attributes, each display attribute having a display attribute value in the form of colors and shapes and a display attribute priority for each attribute value;
   a display update means, coupled to the display attribute table, the dynamic object store and the display means;
in response to a change of the value of one or more of the object attributes of any dynamic object, the display update means reads the display attribute value and the display attribute priority of each display attribute associated with each of the object attribute values of a changed dynamic object from the display attribute table, the display update means selects the display attribute value with the highest display attribute priority for each display attribute, the display update means then updates the visual appearance of the dynamic object in color and shape as a combined symbol on the display means in accordance with the selected display attribute values having the highest priority for color and shape.

2. The computer system of claim 1 wherein the change in an object attribute value is caused by a user action, and there are one or more colors and shapes for the object attribute values.

3. The computer system of claim 1 further comprising a plurality of applications located in the memory means each application coupled to the dynamic object store such that each application can create, read, update and delete objects in the display object store wherein the change of object attribute value is caused by an application.

4. The computer system in claim 3 wherein one or more of the applications are located in a memory means of one of a plurality of computer systems interconnected by a computer network.

5. The computer system in claim 3 wherein the display object store and the display attribute table are stored in a database.

6. The computer system in claim 3 wherein the display object store and the display attribute table are stored in a database on a fileserver.

7. The computer system in claim 3 further including a maintenance application coupled to the display attribute table, the maintenance application allowing a user to maintain the display attribute table.

8. The computer system in claim 1 wherein the display object store and the display attribute table are stored in a database.

9. In a computer system including a processing means, a memory means, a display means, input means interconnected by a system bus, and a subsystem for updating a visual appearance of dynamic display images or objects presented on the display means, including a dynamic object store in the memory means, said dynamic object store having at least one dynamic object, said dynamic object having a plurality of object attribute, each object attribute having an object attribute value; a display attribute table in the memory means, said display attribute table consisting of a second plurality of object attribute values and for each object attribute value an associated plurality of display attributes, each display attribute having a display attribute value in color and shape and a display attribute priority for each color and shape; a display update means, coupled to the display attribute table and the dynamic object store; the method comprising the steps of:

changing a value of one or more of the object attributes of any dynamic object in the dynamic object store;

reading the display attribute value in terms of color and shape and the display attribute priority of each color and shape display attribute associated with each of the object attribute values of a changed dynamic object from the display attribute table;

selecting the display attribute value of color and shape with the highest display attribute priority for each display attribute and updating the visual appearance of the dynamic object in color and shape as a combined symbol on the display means in accordance with the highest priority of the selected display attribute values.

* * * * *